Patented July 9, 1940

2,207,021

UNITED STATES PATENT OFFICE 2,207,021

AMINOARYL SULPHONES AND THEIR MANUFACTURE

Henry Martin and Rudolf Hirt, Basel, Switzerland, assignors to the firm J. R. Geigy A. G., Basel, Switzerland, No Drawing. Application July 26, 1938, Serial No. 221,442. In Switzerland July 31, 1937

7 Claims. (Cl. 260—457)

This invention relates to the manufacture of aminoaryl sulphones and has among its objects the production of new and valuable textile assistants.

According to the present invention such substances are produced by a process which comprises treating certain N-compounds, capable of reacting therewith, with sulphones containing exchangeable halogen in the benzene nucleus and of the general formula

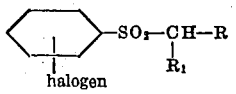

wherein R represents a hydrogen atom, or a saturated or unsaturated, substituted or unsubstituted aliphatic or alicyclic radical which may be interrupted by hetero-atoms or hetero-atom groups, and $R_1$ represents a hydrogen atom or CO—X (with X as alkyl or aryl radical, a hydroxyl, alkoxy, amino, mono-alkyl- or dialkylamino group). A further condition is that at least one of the symbols R or $R_1$ must represent a highly molecular radical with at least 6 carbon atoms.

As N-compounds capable of reaction may be mentioned ammonia or aliphatic, araliphatic and hydroaromatic primary or secondary amines, the latter containing the same or different substituents, capable of reaction, of aliphatic, aliphatic-hydroaromatic or heterocyclic nature. The resulting primary, secondary and tertiary amino sulphones may be aftertreated with the usual alkylating agents, one or more times as appropriate, or be converted into salts of organic or inorganic acids.

As initial substances may be mentioned by way of example those halogen aryl sulphones which are obtained by the reaction of alkali salts of halogenated aryl sulphonic acids with alkyl mineral acid esters, such as halogen alkyls, halogenated paraffins and sulphuric acid esters of aliphatic alcohols. There are also suitable those halogen aryl sulphones which can be obtained by treating α-halogen carboxylic acids and their derivatives, such as α-halogen carboxylic acid esters or -amides, with salts of halogenated aryl sulphinic acids, if necessary in the presence of solvents and/or with the application of pressure. α-halogen ketones or halogen methyl-alkyl ethers and -thio ethers are also initial substances which may be used.

The same halogen aryl sulphones can also be obtained by oxidation of the corresponding halogen sulphides, produced by the reaction of halogen thiophenols with the above mentioned halogen compound capable of reaction.

As alkyl halogenides are especially suitable highly molecular aliphatic or alicyclic mineral acid esters, as are obtained for example from mineral acids and the alcohols, which are obtained by hydrogenating the natural fats, oils, resins, naphthenic acids and the like. Cetyl bromide, dodecyl bromide and also the mixture of higher aliphatic chlorides available on the market under the name lauryl chloride, are equally suitable for the purpose.

As α-halogenated carboxylic acids and carboxylic acid derivatives there are mainly suitable highly molecular saturated or unsaturated, also substituted carboxylic acids such as palmitic acid, stearic acid, dichlorostearic acid, oleic acid, behenic acid, palm-nut fatty acid and naphthenic acid.

By the use of α-halogen ketones, such as α-bromo-stearophenone, α-bromo-laurophenone or α-halogenated aliphatic alkyl ketones, there are obtained sulphones with keto groups. Bodies of the same group may however also be obtained by alkylating condensation products obtained from halogen sulphinates and ω-halogen acetophenones, with highly molecular alkylating agents such as cetyl bromide.

With halogen methyl-dodecyl ethers or -thio ethers and halogen aryl sulphinates there are obtained sulphones, with halogen capable of reaction, of which the alkyl chain is interrupted by an oxygen or sulphur atom.

The halogen sulphones thus described can be reacted by the process claimed with ammonia or aliphatic, araliphatic and hydroaromatic primary or secondary amines, capable of reaction, into the corresponding primary, secondary and tertiary amines. For this purpose there are suitable amongst others ammonia, methylamine, butylamine, benzylamine, cyclohexylamine, dimethylamine, diethylamine, dibutylamine, diamylamine, methylbenzylamine, methylcyclohexylamine, piperidine, in the presence of catalysts such as copper.

The primary, secondary and tertiary aminoaryl sulphones obtained by the reaction with amines may be subsequently alkylated once or if desired a number of times, which is preferably effected for example by means of methyl iodide or with dialkyl sulphates such as dimethyl sulphate or diethyl sulphate or with toluene sulphonic acid alkyl esters and halogen benzene sulphonic acid esters.

The new N-containing compounds, insofar as they are not quaternary ammonium compounds, are very frequently, as bases, bodies capable of being distilled in a vacuum, which are difficultly soluble or insoluble in water. They can be converted into water soluble compounds by the methods generally usual for ammonia derivatives. With inorganic or organic acids there are formed salts, for example hydrochlorides, sulphates, phosphates, silica fluorates, formates and citrates.

The new aminoaryl sulphones can be used for the most various purposes. They are in part valuable wetting, dispersing and emulsifying agents, especially however softening agents for cotton and cellulose regenerates but also valuable agents for improving the fastness to water of direct dyeings or stripping agents for naphthol-AS- or vat-dyeings. In part they are also suitable for protecting wool, feathers, furs, hair, leather and other materials against moths and other wool damaging insects. The strong bactericidal and fungicidal properties of some of the new compounds are also interesting.

The invention is illustrated by the following examples, the parts being by weight:

EXAMPLE 1

(a) *Production of 4-chlorophenyl-1-hexadecyl sulphide*

16.8 parts (3/10 mol.) of potassium hydroxide are dissolved in 220 parts of alcohol. This solution is treated with 43.2 parts of p-chloro-thiophenol

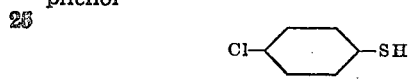

(3/10 mol.) and moderately heated up to complete solution. Then there are added to the hot solution 91.5 parts of cetyl bromide (3/10 mol.) whereupon a vigorous reaction immediately takes place with separation of potassium bromide. After a few minutes the reaction has finished and the solution has a neutral reaction. The same is cooled and mixed with water. The mixture is shaked out with ether, the ether washed with dilute lye, dried and distilled off. The residue is distilled under reduced pressure. Boiling point: 220–240° C. 1.0 mm./Hg (yellowish oil which soon solidifies).

The corresponding bromophenyl-1-hexadecyl sulphide is obtained in a quite similar manner.

(b) *Production of 4-chlorophenyl-1-hexadecyl sulphone*

74 parts of

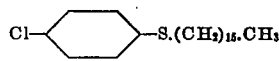

(2/10 mol.) are dissolved in a mixture of 400 parts of acetone and 100 parts of glacial acetic acid at 40° C. The mass is now cooled to 30° C. and, whilst thoroughly stirring and cooling (temperature 30°–40° C.) treated with potassium permanganate in small proportions until a permanent red coloration is produced and no further heat development occurs. Finally further stirring takes place for an hour at 40° C., the whole is then poured into water and bleached with bisulphite. Then it is etherized and the ether extract is shaken with dilute soda lye. The gelatine thus formed is filtered off and the ether is distilled off after drying. The raw product can be crystallized out for purification from a mixture of 1 part of benzine (boiling range 80–100° C.) and 1 part of petrol ether. Melting point 66–68° C. This sulphone may also be obtained in the known manner by treating p-chloro-benzene sulphinate with cetyl halogenide. Instead of cetyl halogenide there may also be used another high molecular alkyl mineral acid ester such as for example lauryl chloride, octo-decyl bromide, octo-decenyl sulphate.

(c) *4-Dimethylaminophenyl-1-hexadecyl sulphone*

20 parts of

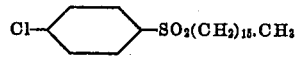

(1/20 mol.) are heated with a solution of 9 parts of dimethylamine (4/20 mol.) in 250 parts of alcohol and a trace of copper powder in an autoclave for 20 hours to 220–230° C. Then it is dissolved in ether, the ether is washed with water, dried, filtered and distilled off. The residue is re-crystallized from benzene. The amine has a melting point of 70–72° C.

It will be understood that instead of dimethylamine there may also be used for the reaction ethylamine, methylethylamine, diethylamine, benzylamine, hexahydroaniline, piperidine, methylfenchyl-amine.

(d) *Methosulphate of the 4-trimethyl ammonium phenyl-1-hexadecyl sulphone*

6 parts of

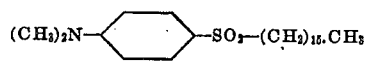

(1/68 mol.) are heated with 3 parts of dimethyl sulphate (1/40 mol.) for half an hour to 130°–140° C. There results a thick honey-like mass which on cooling solidifies to a wax-like mass which is clearly soluble in water.

(e) *Ethosulphate of the 4-ethyl dimethyl ammonium phenyl-p-hexadecyl sulphone*

6 parts of the base mentioned under (c) and 4 parts of diethyl sulphate are heated for 1 hour to 150° C. There is formed a browny mass which is clearly soluble in hot water. If instead of cetyl-bromide fenchyl-bromide or α-methyl-dodecyl-bromide is used there is obtained finally a compound with similar properties.

Instead of the dimethyl sulphate or diethyl sulphate used under (d) and (e) there may also be used other low molecular alkyl esters, such as toluene sulphonic acid-methoxyethylene glycol ester, glycol chlorohydrine, chloro-benzene sulphonic acid propylester.

EXAMPLE 2

*p-Dimethylaminophenyl-undecyl-sulphone-carboxylic acid ester*

According to known processes (U. S. Patent 2,010,754) α-bromolauric acid-ethyl ester is treated in an autoclave at 160° C. with the sodium salt of p-chloro- or p-bromo-phenyl sulphinic acid in alcohol. The sulphone obtained constitutes a thick yellowy oil. It is treated as indicated in Example 1 with an alcoholic dimethylamine solution in an autoclave at 220° C. In this case the quantity of the dimethylamine is preferably twice the proportion taken in Example 1. Other amines of those enumerated in Example 1 may also be used here.

The base obtained is converted by heating with dimethyl sulphate into the quaternary compound and thus becomes clearly water soluble. Instead of α-bromolauric acid ethyl ester there may also be used for example the butyl ester; this ester can also be replaced by α-bromo-stearic acid ester. If instead of the α-bromolauric acid ester, the free acid or the amide, methyl- or diethyl-amide is used, similar compounds are obtained.

EXAMPLE 3

(a) *p-Chlorophenyl-phenacyl sulphone*

80 parts of the sodium salt of p-chlorophenylsulphinic acid (61.4%), corresponding with $\tfrac{3}{10}$ mol., are dissolved in as little hot water as possible (about 200 parts). There are now added 46 parts of ω-chloro-aceto-phenone ($\tfrac{3}{10}$ mol.) and the mixture refluxed for 5 hours. The condensation product soon separates as solid crust. It is now sucked-off and washed with water. For purification it is further recrystallized from alcohol. The product is thus obtained in shiny sheets with a melting point of 135–136° C.

(b) α-(p-Chlorophenylsulphonyl)-stearophenone 1.15 parts of sodium are dissolved in 100 parts of absolute alcohol. There are now added 14.75 parts of

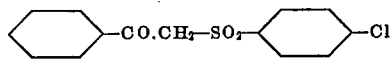

and heated up to complete solution. There are then added 15 parts of cetyl bromide and boiling takes place by reflux for 15 hours. It is then treated with water and shaken out with ether. After drying and distilling off, the residue is ground with alcohol of 80% strength and the solidified product is sucked off. For further purification re-crystallization is effected from a little alcohol. The fatty mass obtained has a melting point of 73° C.

(c) α-(p-Dimethylaminophenyl-sulphonyl)-stearophenone

Conversion of

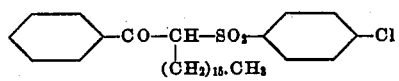

with dimethylamine is performed as indicated in Example 1 also in an autoclave. By treating the reaction product with dimethyl sulphate there is also obtained in this case the quaternary base as a wax-like, water soluble mass.

The modification indicated in Example 1 may obviously also be applied here.

What we claim is:

1. A process for the production of quaternary monoaminoaryl sulphones, comprising causing a p-halogen-phenyl-sulphone of the general formula

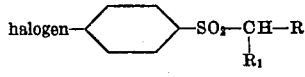

wherein R represents a member of the group consisting of H, an alkyl and cycloalkyl radical, $R_1$ represents a member of the group consisting of H, alkyl and —CO—X (X being one of the group consisting of aryl, OH, alkoxy, amino, monoalkyl-amino and dialkylamino), whereby at least one of the R and $R_1$ must contain a highly molecular substituent with at least 6 carbon atoms selected from the group consisting of alkyl and cycloalkyl radicals to react with a nitrogen compound selected from the group consisting of secondary aliphatic, araliphatic and hydroaromatic amines so as to form, by exchanging the nuclear bound halogen for the radical of the amino compound, the corresponding p-aminoaryl sulphone and treating the so obtained tertiary aminosulphone with one of the group consisting of alkylating and aralkylating agents.

2. The quaternary ammonium compounds of monoaminoaryl sulphones of the general formula

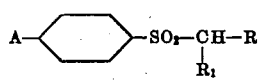

wherein R represents a member of the group consisting of H, an alkyl and cycloalkyl radical, $R_1$ represents a member of the group consisting of H, alkyl and —CO—X (X being one of the group consisting of aryl, OH, alkoxy, amino, monoalkyl-amino and dialkylamino), whereby at least one of the R and $R_1$ must contain a highly molecular substituent with at least 6 carbon atoms selected from the group consisting of alkyl and cycloalkyl radicals, and wherein A represents the radical of a nitrogen compound selected from the group consisting of secondary aliphatic, araliphatic and hydroaromatic amines, said quaternary aminoaryl sulphones being colorless compounds useful as assistants in the textile and related industries, moth-proofing, bactericidal and fungicidal agents.

3. The quaternary ammonium compounds of monoaminoaryl sulphones of the general formula

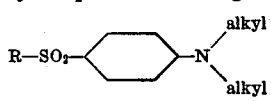

with R as an alkyl and cycloalkyl radical containing more than 6 carbon atoms, being colorless compounds useful as assistants in the textile and related industries, moth-proofing, bactericidal and fungicidal agents.

4. The quaternary monoaminoaryl sulphones of the general formula

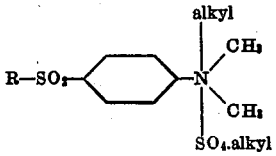

with R as an alkyl and cycloalkyl radical containing more than 6 carbon atoms, being colorless compounds useful as assistants in the textile and related industries, moth-proofing, bactericidal and fungicidal agents.

5. The quaternary aminoaryl sulphone of the formula

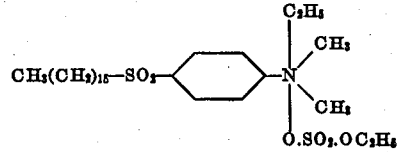

being a colorless compound, soluble in water, useful as softening agent for native and regenerative cellulose.

6. The quaternary aminoaryl sulphone of the formula

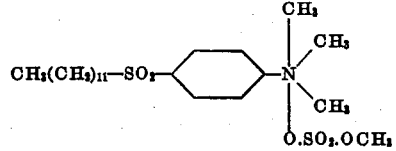

being a colorless compound, soluble in water, useful as moth-proofing and stripping agent for naphthol-AS-dyeings.

7. The quaternary aminoaryl sulphone of the formula

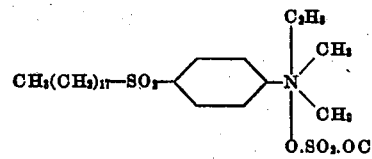

being a colorless compound, soluble in water, useful as softening agent for native and regenerative cellulose.

HENRY MARTIN.
RUDOLF HIRT.